United States Patent
Enarson et al.

[19]

[11] Patent Number: 6,078,455
[45] Date of Patent: Jun. 20, 2000

[54] TEMPERATURE DEPENDENT DISC DRIVE PARAMETRIC CONFIGURATION

[75] Inventors: Karl L. Enarson, Yukon; Timothy T. Walker, Edmond; Ronald D. Metzner, Yukon; Anish A. Ukani, Oklahoma City, all of Okla.

[73] Assignee: Seagate Technology, Inc., Scotts Valley, Calif.

[21] Appl. No.: 09/350,832

[22] Filed: Jul. 9, 1999

Related U.S. Application Data

[63] Continuation of application No. 08/962,459, Oct. 31, 1997, abandoned.
[60] Provisional application No. 60/049,614, Jun. 13, 1997.

[51] Int. Cl.[7] .................................. G11B 5/02; G11B 5/18
[52] U.S. Cl. .......................... 360/68; 360/69; 360/78.04
[58] Field of Search ............................. 360/78.06, 77.04, 360/66–68, 78.04, 78.05, 97.02, 69; 369/116

[56] References Cited

U.S. PATENT DOCUMENTS

| | | |
|---|---|---|
| 3,723,980 | 3/1973 | Gabor . |
| 4,799,102 | 1/1989 | Bremmer et al. . |
| 4,907,109 | 3/1990 | Senio . |
| 4,937,689 | 6/1990 | Seaver et al. . |
| 4,965,501 | 10/1990 | Hashimoto . |
| 5,047,876 | 9/1991 | Holsinger . |
| 5,084,791 | 1/1992 | Thanos et al. ..................... 360/77.04 |
| 5,128,813 | 7/1992 | Lee ..................................... 360/78.07 |
| 5,262,907 | 11/1993 | Duffy et al. . |
| 5,276,662 | 1/1994 | Shaver, Jr. et al. . |
| 5,408,365 | 4/1995 | Van Doorn et al. . |
| 5,412,518 | 5/1995 | Christner et al. . |
| 5,422,760 | 6/1995 | Abbott et al. . |
| 5,444,583 | 8/1995 | Ehrlich et al. ..................... 360/78.09 |
| 5,455,717 | 10/1995 | Van Doorn et al. . |
| 5,550,502 | 8/1996 | Aranovsky . |
| 5,592,340 | 1/1997 | Minuhin et al. . |
| 5,594,603 | 1/1997 | Mori et al. . |
| 5,631,999 | 5/1997 | Dinsmore . |
| 5,726,818 | 3/1998 | Reed et al. ........................... 360/51 |

*Primary Examiner*—Glenton B. Burgess
*Assistant Examiner*—K. Wong
*Attorney, Agent, or Firm*—Crowe & Dunlevy

[57] ABSTRACT

A method and apparatus are disclosed for optimizing operational performance of a disc drive through temperature dependent parametric configuration. A plurality of parameter sets corresponding to a plurality of predefined contiguous operational temperature ranges of the disc drive are initially established. During operation of the disc drive, a temperature sensor is used to periodically measure the temperature of the drive. The operational temperature range in which the measured temperature falls is identified, and the disc drive utilizes the parameter set corresponding to the identified operational temperature range.

9 Claims, 3 Drawing Sheets

TEMPERATURE DEPENDENT DISC DRIVE PARAMETRIC CONFIGURATION

RELATED APPLICATIONS

This application is a continuation of application Ser. No. 08/962,459 filed on Oct. 31, 1997, now abandoned.

This application claims priority to Provisional Application No. 60/049,614 entitled WRITE CURRENT TEMPERATURE CONTROLLED CONFIGURATION, filed Jun. 13, 1997.

FIELD OF THE INVENTION

This invention relates generally to the field of disc drive storage devices, and more particularly, but not by way of limitation, to the parametric configuration of a disc drive in relation to the temperature of the drive.

BACKGROUND OF THE INVENTION

Hard disc drives enable users of computer systems to store and retrieve vast amounts of data in a fast and efficient manner. In a typical disc drive, the data are magnetically stored on one or more discs which are rotated at a constant high speed and accessed by a rotary actuator assembly having a plurality of read/write heads that fly adjacent the surfaces of the discs.

The position of the heads is controlled by a closed loop, digital servo circuit. A preamp and driver circuit generates write currents that are used by the head to magnetize the disc during a write operation and amplifies read signals detected by the head during a read operation. A read/write channel and interface circuit is operably connected to the preamp and driver circuit to transfer the data between the discs and a host computer in which the disc drive is mounted.

Disc drive manufacturers typically produce a large number of nominally identical drives which are individually optimized during the manufacturing process through the setting of parameters that affect the operation of various disc drive circuits, such as the preamp and driver circuit, the servo circuit and the read/write channel. Such parameters are well known and typically include write current, write precompensation, servo gain, data and servo level detection thresholds, transversal equalizer tap weights, adaptive filtering parameters and, in disc drives employing magneto-resistive (MR) heads, read bias current. Such parameters are used to enable the disc drive to accommodate changes in data transfer rates that occur with respect to the radii on the discs at which the data are stored, noise levels, electrical and mechanical offsets and the like, all of which generally affect the operation of the drive.

Accordingly, the parameters are often set to an initial value during disc drive operation and then optimized against predefined acceptance criteria (for example, measured read error rate). Disc drives are often further provided with the capability of continually monitoring drive performance and adjusting certain parameters adaptively during operation to maintain optimum levels of performance.

One of the most significant variables affecting disc drive performance is temperature. Disc drives are complex electromechanical devices which include motors to rotate the discs and the actuator assembly. Although such motors are designed to operate efficiently, heat will nevertheless be generated as the disc drive operates over an extended period of time, which can substantially increase the operating temperature of the drive. Disc drives further include one or more processors and associated integrated circuitry having performance characteristics which are also affected by changes in temperature.

Attempts have been made in the prior art to compensate for variations in temperature in magnetic recording devices such as disc drives. For example, U.S. Pat. No. 3,723,980 entitled TEMPERATURE COMPENSATION SYSTEM FOR A MAGNETIC DISK MEMORY UNIT issued Mar. 27, 1973 to Gabor compensates for variations in temperature through efforts to maintain a substantially uniform temperature and by using similar materials in similar locations within a drive. U.S. Pat. No. 5,408,365 entitled RECORDING DEVICE WITH TEMPERATURE-DEPENDENT WRITE CURRENT CONTROL issued Apr. 18, 1995 to Van Doorn et al. discloses a magnetic tape device wherein a magneto-resistive head element in contact with a recording tape media is used to monitor the temperature of the media, enabling adjustments in write current magnitude accordingly. U.S. Pat. No. 5,550,502 entitled CONTROL CIRCUIT AND METHOD FOR THIN FILM HEAD WRITE DRIVER issued Aug. 27, 1996 to Aranovsky discloses a write driver control circuit in a magnetic storage device that provides sufficient range in the input voltage level to accommodate temperature and process variations during the operation of the device. U.S. Pat. No. 5,455,717 entitled RECORDING DEVICE WITH TEMPERATURE-DEPENDENT WRITE-CURRENT CONTROL issued Oct. 3, 1995 to Van Doorn et al. discloses a compensation circuit for controlling the amplitude of the write current in relation to temperature variations within a drive.

While operable, these and other prior art references are generally limited to the optimization of write current levels and are not readily adaptable for optimization of other temperature sensitive parameters. Moreover, such approaches as found in the prior art typically attain write current optimization through the implementation of additional circuitry that continuously monitors the temperature of the drive and adjusts the write current accordingly, which generally increases the cost and complexity of the drive.

Thus, there is a continual need for improvements in the art whereby disc drive performance can be readily optimized in response to variations in the temperature of a disc drive for a wide range of temperature-dependent disc drive parameters.

SUMMARY OF THE INVENTION

The present invention provides an apparatus and method for optimizing the operational performance of a disc drive through temperature dependent parametric configuration.

In accordance with a preferred embodiment, the disc drive comprises a temperature sensor which provides an indication of operational temperature of the disc drive and a parametric configuration circuit responsive to the temperature sensor which identifies selected parameters for use by the disc drive to optimize disc drive performance. The parameters are arranged as a plurality of parameter sets corresponding to a plurality of predefined operational temperature ranges.

The parametric configuration circuit periodically measures the operational temperature of the disc drive, identifies the operational temperature range in which the measured operational temperature falls, and implements the parameter set corresponding to the identified operational temperature range.

Preferably, the parametric configuration circuit comprises a control processor used to control the operation of the disc drive. The parameters can be any number of conventional parameters typically used by disc drives to optimize performance of various disc drive circuits such as head preamp and driver circuits, read/write channels and servo control circuits. In the preferred embodiment, the parameters include write current, prewrite compensation, read bias current, servo gain, data and servo detection thresholds, adaptive filter levels and transversal equalizer tap weights.

These and various other features as well as advantages which characterize the present invention will be apparent from a reading of the following detailed description and a review of the associated drawings.

DETAILED DESCRIPTION

Figure 1:
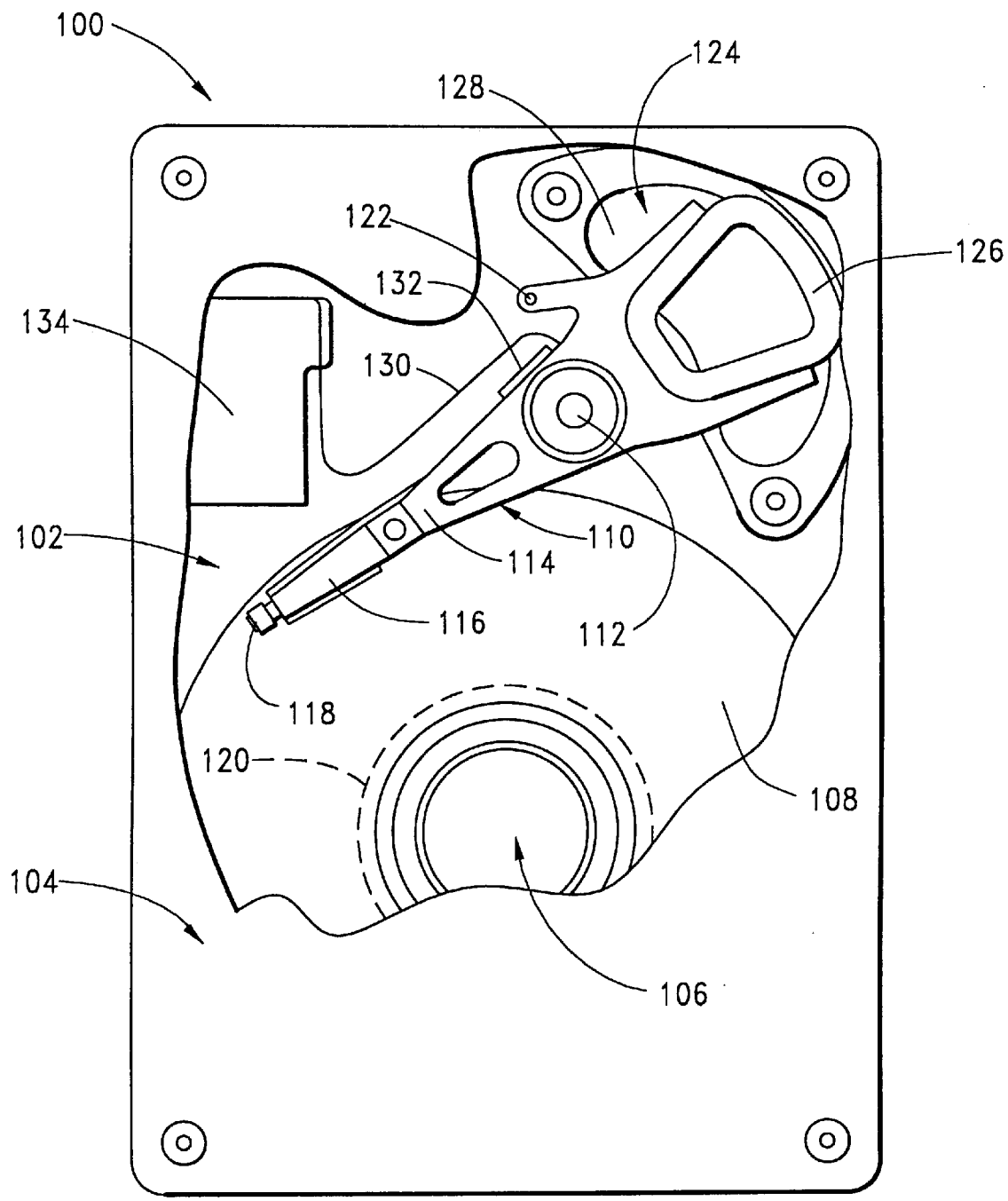
FIG. 1 shows a top plan view of a disc drive constructed in accordance with a preferred embodiment of the present invention.

Before discussing the operation of a preferred embodiment of the present invention, it will be useful to first briefly describe a disc drive storage device in which the present invention can be advantageously practiced. Referring to FIG. 1, shown therein is a top plan view of a disc drive 100 having a base deck 102 on which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) is provided to rotate one or more discs 108 at a constant high speed. User data are written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend toward the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

When the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. As will be recognized, a second magnetic flux path is disposed above the permanent magnet 128, but has not been shown for purposes of clarity. The controlled application of current to the coil 126 causes magnetic interaction between the permanent magnet 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
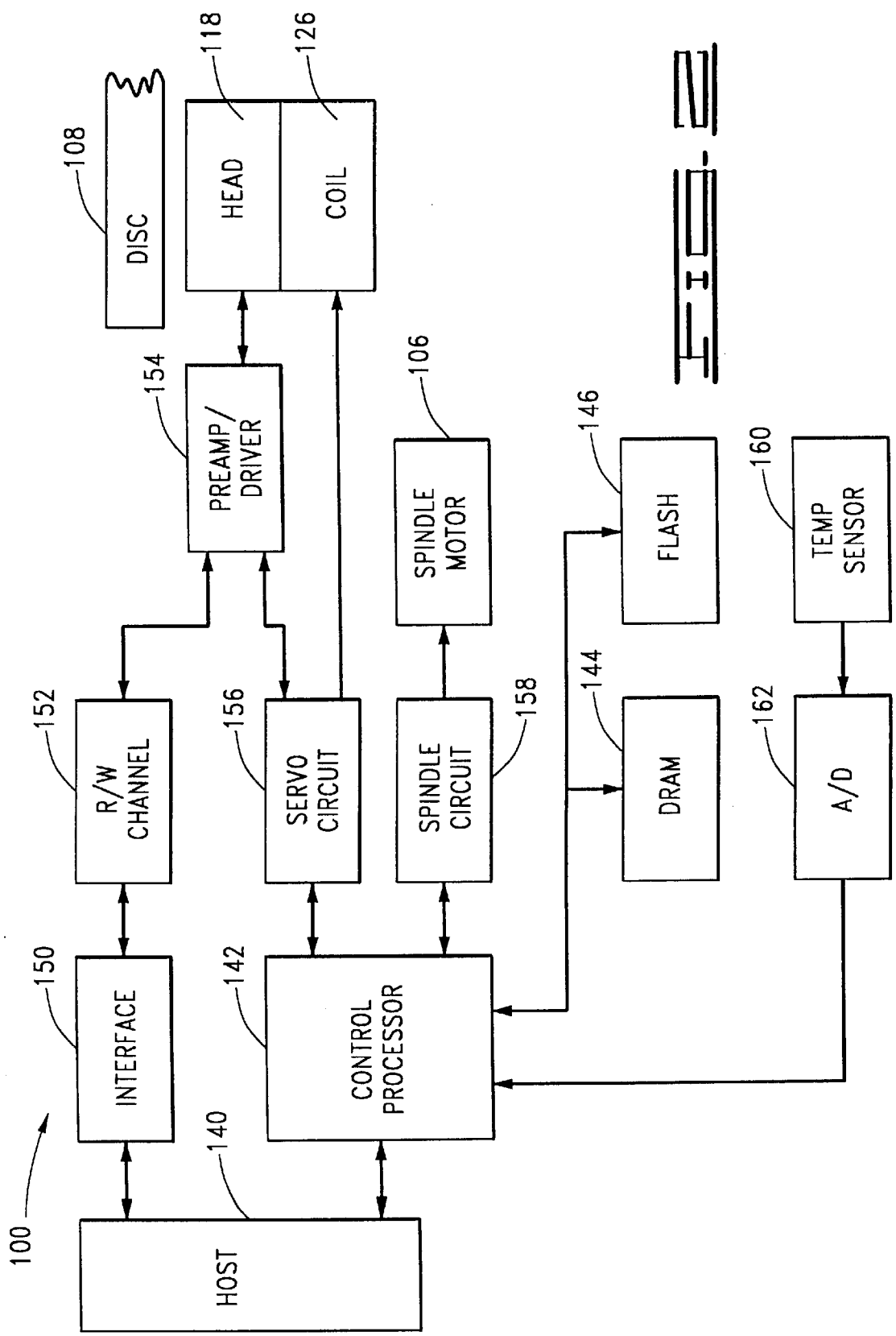
FIG. 2 provides a functional block diagram of the disc drive of FIG. 1 operably connected to a host computer in which the disc drive is mounted.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. A disc drive control processor 142 provides top level control of the operation of the disc drive 100. Programming and information utilized by the control processor are provided in both volatile and non-volatile memory devices, including a dynamic random access memory (DRAM) device 144 and a flash memory device 146 shown in FIG. 2. It will be recognized, however, that the memory device structure can vary depending upon the requirements of a particular application. The contents of the DRAM 144 are loaded periodically during the operation of the disc drive 100, such as during powerup.

An interface circuit 150 includes a data buffer (not shown) for the temporary buffering of data between the host computer 140 and the discs 108 and a sequencer (also not shown) that directs the operation of the disc drive 100 during data transfer operations. Generally, during a data write operation a read/write channel 152 encodes data to be written to the disc 108 with run-length limited (RLL) and error correction codes (ECC) and write currents corresponding to the encoded data are applied by a preamp driver circuit 154 to the head 118 in order to selectively magnetize the disc 108. During a data read operation, the preamp driver circuit 154 applies a read bias current to the head 118 and monitors the voltage across a magneto-resistive (MR) element of the head 118, which varies with respect to the selective magnetization of the disc 108. The voltage is preamplified by the preamp driver circuit 154 to provide a read signal to the read/write channel 152 which decodes the stored data and provides the same to the buffer of the interface circuit 150, for subsequent transfer to the host computer 140. For reference, disc drive read and write operations are discussed in greater detail in U.S. Pat. No. 5,276,662 entitled DISC DRIVE WITH IMPROVED DATA TRANSFER MANAGEMENT APPARATUS, issued Jan. 4, 1994 to Shaver, Jr. et al., assigned to the assignee of the present invention.

A servo circuit 156 controls the position of the head 118 through servo information read by the head 118 and provided to the servo circuit 156 by way of the preamp driver 154. The servo information indicates the relative position of the head 118 with respect to a selected track on the disc 108. In response to the servo information, a digital signal processor (not shown) controls the application of current to the coil 126 in order to adjust the position of the head 118 to a desired relation. The construction and operation of closed loop, digital servo systems such as 154 are generally discussed in U.S. Pat. No. 5,262,907 entitled HARD DISC DRIVE WITH IMPROVED SERVO SYSTEM, issued Nov. 16, 1993 to Duffy et al., assigned to the assignee of the present invention.

A spindle circuit 158 is provided to control the rotation of the discs 108 through back electromagnetic force (bemf) commutation of the spindle motor 106. For additional discussion of typical spindle circuits, see U.S. Pat. No. 5,631,999 entitled ADAPTIVE COMPENSATION FOR HARD DISC DRIVE SPINDLE MOTOR MANUFACTURING TOLERANCES, issued May 20, 1997 to Dinsmore, assigned to the assignee of the present invention.

Continuing with FIG. 2, a temperature sensor 160 is provided to measure the temperature of the disc drive 100. The temperature sensor is preferably mounted inside the interior of the disc drive 100 in proximity to the heads 118, although the temperature can be mounted elsewhere, such as on the disc drive printed circuit board (not shown) housing the other disc drive electronics shown in FIG. 2. The output from the temperature sensor 160 is an analog temperature signal which is converted to digital form by an analog to digital (A/D) converter 162, so that the control processor 142 can obtain a digital indication of the temperature of the disc drive 100.

In the practice of a preferred embodiment, the control processor 142 initially establishes three parameter sets corresponding to three different operational temperature ranges: cold, ambient and hot. Cold is defined as a temperature of less than 15 degrees Celsius (° C.), ambient is defined as a temperature between (and including) 15° C. and 45° C., and hot is defined as a temperature above 45° C. Other temperature ranges could readily be established.

Each parameter set comprises values for selected parameters used by the read/write channel 152 and the servo circuit 156. The values are preferably optimized during dynamic burn-in (DBI) wherein the disc drive 100 is operated in an environmental chamber over a range of temperature extremes. In one approach, the parameters are selected as the disc drive 100 is operated within each of the above defined ranges. Alternatively, a population of nominally identical disc drives 100 are selected and evaluated to establish a series of delta-values, each indicative of parametric change relative to nominal values obtained when the disc drive is operated at a selected room-ambient temperature (such as 20° C.). Thereafter, each of the disc drives 100 is operated at the ambient temperature to establish baseline parametric values that are used for the ambient temperature range and the delta-values are added to the baseline parametric values to establish the parameter sets for the cold and hot temperature ranges.

The preferred parameters which are optimized and utilized in accordance with a preferred embodiment are listed in Table I. below.

TABLE I

| PARAMETER | COLD<br>T < 15° C. | AMBIENT<br>15° C. ≦ T ≦ 45° C. | HOT<br>T < 45° C. |
|---|---|---|---|
| Write Current | $I_{W1}$ | $I_{W2}$ | $I_{W3}$ |
| Prewrite Comp. | $PC_1$ | $PC_2$ | $PC_3$ |
| Read Bias | $I_{R1}$ | $I_{R2}$ | $I_{R3}$ |
| Servo Gain | $K_{P1}$ | $K_{P2}$ | $K_{P3}$ |
| Data Threshold | $T_{D1}$ | $T_{D2}$ | $T_{D3}$ |
| Servo Threshold | $T_{S1}$ | $T_{S2}$ | $T_{S3}$ |
| Adaptive Filter | $F_1$ | $F_2$ | $F_3$ |
| Tap Weights | $W_{T1}$ | $W_{T2}$ | $W_{T3}$ |
| MR Asymmetry | $MR_1$ | $MR_2$ | $MR_3$ |

TABLE I-continued

| PARAMETER | COLD<br>T < 15° C. | AMBIENT<br>15° C. ≦ T ≦ 45° C. | HOT<br>T < 45° C. |
|---|---|---|---|
| VGA Gain | $K_{VGA1}$ | $K_{VGA2}$ | $K_{VGA3}$ |
| Servo Bandwidth | $B_{S1}$ | $B_{S2}$ | $B_{S3}$ |

The parameters listed in Table I. are well known and are typically employed in disc drives of the present generation; further, these parameters are provided merely for purposes of illustration and it will be readily understood that the practice of the present invention is not limited to use of these particular parameters. For purposes of clarity, however, each of these parameters will be briefly described as follows.

Beginning with write current, this parameter is the magnitude of the current passed through a write element of the head 118 during a write operation. The disc drive 100 is contemplated as employing zone based recording (ZBR) such as described in U.S. Pat. No. 4,799,102 entitled METHOD AND APPARATUS FOR RECORDING DATA issued Jan. 17, 1989 to Bremmer et al., assigned to the assignee of the present invention, so that a different write current is selected for each zone of tracks on the discs 108 (each zone having the same number of data sectors). Moreover, write current is typically optimized for each head/disc combination, as discussed in copending U.S. patent application Ser. No. 08/536,958 entitled SELECTION OF OPTIMUM WRITE CURRENT IN A DISC DRIVE TO MINIMIZE THE OCCURRENCE OF REPEATABLE READ ERRORS, filed Sep. 29, 1995 by Kassab, assigned to the assignee of the present invention.

Accordingly, the term $I_{W1}$ from Table I. describes a set of write current values for each head for each of the zones when the temperature T of the disc drive 100 is less than 15° C. (as measured by the temperature sensor 160). Similarly, the term $I_{W2}$ describes a second set of write current values for operation of the disc drive 100 in the range of 15° C.≦T≦45° C. and the term $I_{W3}$ describes a third set of write current values for operation of the disc drive at a temperature T above 45° C. Similar terms are provided in Table I. for each of the parameters listed.

The next parameter in Table I., prewrite compensation ("Prewrite Comp."), is a timing adjustment applied to the writing of each flux transition to the discs 108 in order to minimize perceived timing shifts in the subsequent detection of the transitions during a read operation. For reference, prewrite compensation is discussed in U.S. Pat. No. 5,047,876 entitled ADAPTIVE PREWRITE COMPENSATION APPARATUS, issued Sep. 10, 1991 to Holsinger, assigned to the assignee of the present invention, Servo gain is the overall gain of the servo circuit 156 and is typically adjusted during the operation of the disc drive 100 to maintain optimal performance of the servo loop. Servo gain adjustments are discussed, for example, in U.S. Pat. No. 4,965,501 entitled SERVO CIRCUIT, issued Oct. 23, 1990 to Hashimoto. Data and servo thresholds are conventional readback signal detection levels used to decode control information and data from data and servo fields on the tracks of the discs 108. The adaptive filter parameter comprises inputs used to control filtering applied by the read channel portion of the read/write channel 152. The tap weight parameter comprises tap weight values used by transversal equalizer circuitry commonly used in read channels employing partial response, maximum likelihood (PRML) detection techniques. MR Asymmetry compensation is compensation applied to readback signals from magneto-resistive (MR) heads in order to reduce asymmetry in positive and negative peaks of the readback signals. VGA Gain and Servo Bandwidth values optimize the gain of variable gain amplifiers and the response characteristics of the disc drive servo circuit 156. For general discussions of these and other parameters, see U.S. Pat. No. 5,422,760 entitled DISK DRIVE METHOD USING ZONED DATA RECORDING AND PRML SAMPLING DATA DETECTION WITH DIGITAL ADAPTIVE EQUALIZATION, issued Jun. 6, 1995 to Abbott et al., U.S. Pat. No. 4,907,109 entitled MAGNETIC DISC DRIVE SYSTEM HAVING AUTOMATIC OFFSET AND GAIN ADJUSTMENT MEANS, issued Mar. 6, 1990 to Senio and U.S. Pat. No. 5,592,340 entitled COMMUNICATION CHANNEL WITH ADAPTIVE ANALOG TRANSVERSAL EQUALIZER, issued Jan. 7, 1997 to Minuhin et al., the latter of which is assigned to the assignee of the present invention.

As mentioned above, the parameter sets listed in Table I. are optimized during disc drive manufacturing using conventional optimization techniques. More particularly, during DBI the parameters are selected to maximize disc drive performance (such as read error rate performance) when the disc drive 100 is operated within each of the identified contiguous temperature ranges (that is, below 15° C., at and between 15° C. and 45° C. and above 45° C.). Temperature zone it will be recognized that other temperature ranges, as well as a different number of ranges, can be readily employed, depending upon the requirements of a given application.

Each set of parameters is stored within the disc drive 100 in a manner to provide subsequent access by the control processor 142. For example, the parameters can be written to guard tracks not normally used by the disc drive 100 to store user data and subsequently loaded into DRAM 144 upon initialization; alternatively, the parameters can be stored in the flash memory 146. It will be recognized that improved disc drive performance will generally be attained through the establishment of parameter sets for a greater number of temperature dependent parameters, as long as sufficient memory space and processing capability exists within the disc drive 100 to utilize the same.

Figure 3:
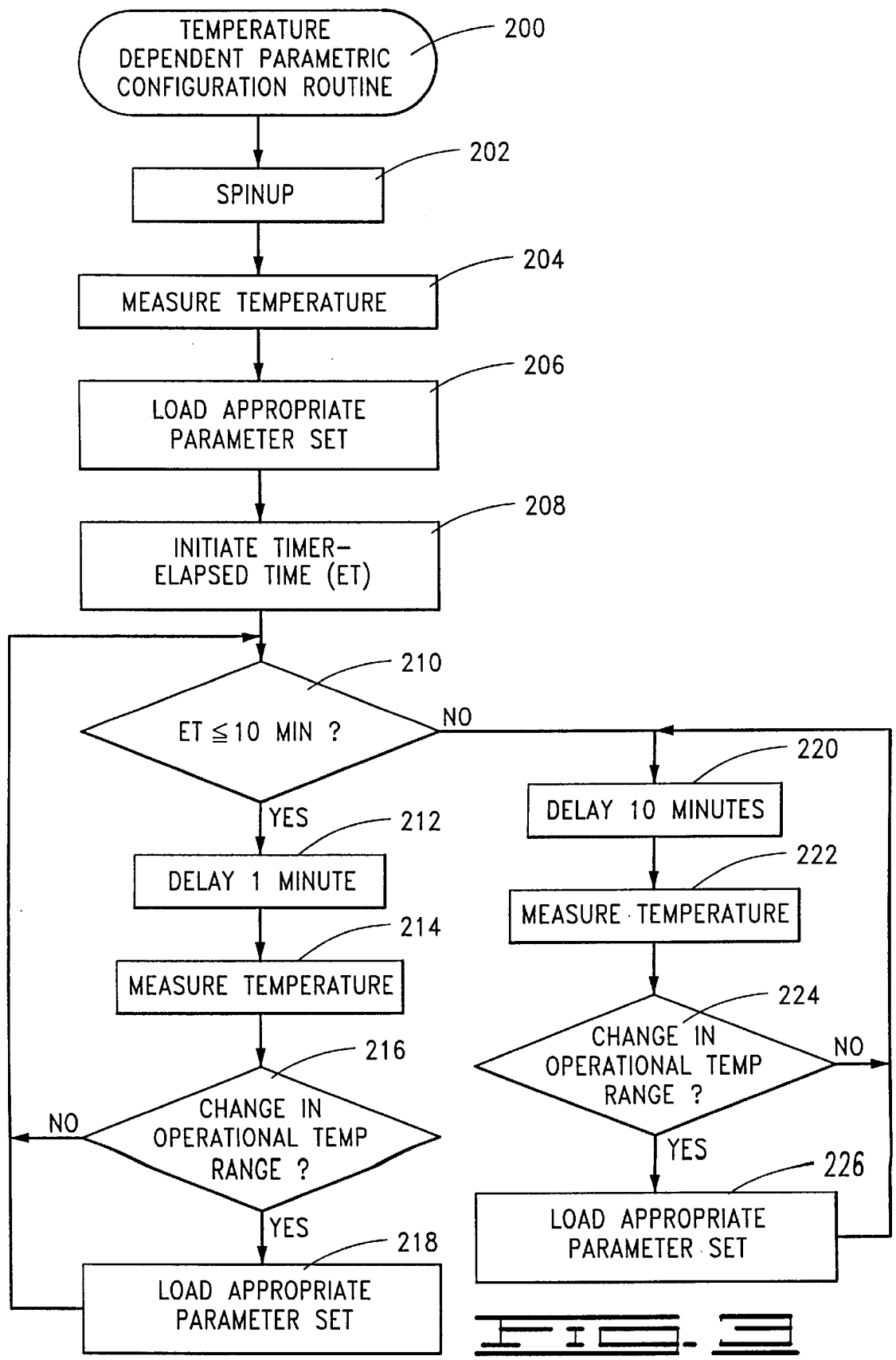
FIG. 3 provides a flow chart for a TEMPERATURE DEPENDENT PARAMETRIC CONFIGURATION routine, performed by the control processor of FIG. 2 in conjunction with programming and information stored in the DRAM and flash memory devices shown in FIG. 2.

Referring now to FIG. 3, shown therein is a flow chart illustrating a TEMPERATURE DEPENDENT PARAMETRIC CONFIGURATION routine, which is performed once the parameter sets of Table I. have been identified. The routine of FIG. 3 is generally representative of programming stored in the flash memory 146 (FIG. 2) and utilized by the control processor 142 (FIG. 2). The routine is contemplated as a top level routine run in conjunction with other conventional routines of the disc drive 100.

The routine begins at block 202, wherein the disc drive 100 first enters a spinup operation during which the disc drive is powered up and the discs 108 are accelerated to a nominal operational speed. It will be understood that other conventional initialization routines are performed during block 202 as well, such as the initialization and self-test of various disc drive systems. Once the spinup operation is completed, the control processor 142 checks the temperature of the disc drive 100 by way of the temperature sensor 160 and the A/D 162 (FIG. 2) to determine whether the disc drive 100 is operating in the cold, ambient or hot temperature ranges, as indicated by block 204. As will be recognized, the disc drive 100 will usually begin in the cold temperature range after being initialized from a cold start, depending upon the environment in which the disc drive 100 is operated.

The routine of FIG. 3 next loads the appropriate parameter set through the operation of block 206 in accordance with the temperature range determined by block 204. More particularly, the respective elements of the read/write channel 152 and the servo circuit 156 are supplied with the appropriate parameters by the control processor 142. The control processor 142 next initiates an internal timer to measure elapsed time (ET), block 208, at the completion of the operation of block 210. The timing operation can be performed by the control processor 142 directly, or additional counter hardware (not shown) can be utilized for this purpose.

Continuing with FIG. 3, the routine passes to decision block 210, which checks whether the elapsed time (EP) is less than or equal to 10 minutes. If so, the routine passes to block 212 wherein the control processor 142 begins a one minute timed delay. Of course, the delay of block 212 is only associated with the routine of FIG. 3, so that the control processor 142 proceeds to operate in a conventional manner to control the operation of the disc drive 100 during the delay of block 212. Once the delay is completed, the control processor 142 checks the temperature of the disc drive 100, as shown by block 214, and determines whether a change in temperature range has occurred, as shown by decision block 216.

If such a change has occurred, the appropriate parameter set is implemented in the read/write channel 152 and the servo circuit 156, as indicated by block 218, after which the routine returns back to decision block 210. When no change in temperature range has occurred, the routine simply passes from decision block 216 back to decision block 210.

Thus, after the disc drive 100 has been initialized, the temperature is checked once a minute for the first ten minutes. When a change in the operational temperature range of the disc drive 100 is detected, the appropriate parameter set is used. Although other timing schemes can be readily implemented, checking the temperature every minute for the first 10 minutes will generally ensure that optimal parameters are continually utilized by the disc drive 100 at a time when relatively large changes in temperature often occur (i.e, during the first few minutes after disc drive initialization).

Continuing with FIG. 3, after ten minutes have elapsed since disc drive initialization, the routine passes from decision block 210 to block 220, wherein the control processor enters a 10 minute delay. At the conclusion of the 10 minute delay, the temperature of the disc drive 100 is checked, decision block 224, and the control processor 142 determines whether a change in the temperature range of the disc drive 100 has occurred. If so, the appropriate parameter set is implemented by block 226 and the routine returns back to block 220 for another 10 minute delay; if not, the routine passes directly back to block 220 without a change in the parameter set. Thus, after the first 10 minutes of disc drive operation, the control processor 142 checks the temperature of the disc drive 100 every 10 minutes and implements the appropriate set of parameters in accordance with changes in the operational temperature range of the disc drive 100.

It is contemplated that the routine of FIG. 3 will continue until such time that the disc drive is deactivated (entering a power off or suspended mode of operation). Further, although the values for most of the parameters of Table I. are generally established during disc drive manufacturing, the parameter sets can be readily updated during operation and these updated parameter sets can be stored by the disc drive 100 for future utilization, as desired.

Although in the preferred embodiment the temperature is measured on a periodic basis, it is contemplated that the temperature can also (or alternatively) be measured at selected operational stages of the disc drive, such as during idle periods, at the beginning of a seek operation, etc., with the parametric configuration of the disc drive being updated accordingly, depending upon whether changes in the operational temperature range of the disc drive have been detected. Moreover, it is contemplated that hysteresis techniques are preferably applied so as to prevent continual changes between two adjacent temperature ranges by the disc drive 100. Thus, for example a ±5° C. band can be advantageously used so that the disc drive does not change from cold to ambient until a temperature of 20° C. is reached (i.e., 15° C.+5° C.) and the disc drive 100 does not change from ambient back to cold until a temperature of 10° C. is reached (i.e., 15° C.−5° C.). As provided above, other temperature boundary values, as well as the number of temperature ranges, can be readily selected, depending upon the requirements of a given application.

Accordingly, in view of the foregoing discussion it will be understood that the present invention provides an apparatus and method for optimizing the operational performance of a disc drive (such as 100) through temperature dependent parametric configuration. A plurality of parameter sets corresponding to a plurality of predefined contiguous operational temperature ranges of the disc drive are initially established. During operation of the disc drive, a temperature sensor (such as 160) is used to periodically measure the temperature of the drive (such as at 214, 222), which is provided to a parametric compensation circuit (such as 142). The operational temperature range in which the measured temperature falls is identified, and the disc drive utilizes the parameter set corresponding to the identified operational temperature range (such as at 216, 218, 224 and 226). Thus, the appropriate parameter set is loaded each time that the disc drive determines that the measured temperature of the disc drive has changed from one operational temperature range to another operational temperature range.

For purposes of the appended claims, the term "circuit" will be understood both hardware and software implementations.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing operational performance of a disc drive, comprising steps of:
   (a) identifying a boundary temperature to establish a first temperature zone comprising a plurality of temperatures which sequentially extend below the boundary temperature and a second temperature zone comprising a plurality of temperatures which sequentially extend above the boundary temperature;
   (b) operating the disc drive while having an operational temperature which falls within the first temperature zone and selectively varying parameter values utilized by selected electronic circuitry of the disc drive;
   (c) selecting a first set of the parameter values selectively varied during step (b) which achieves a desired level of operational performance by the disc drive, the first set of the parameter values stored for subsequent use by the selected electronic circuitry of the disc drive when the disc drive is operated while having an operational temperature equal to any selected temperature from the first temperature zone,
   (d) selecting a second set of the parameter values which achieve a desired level of operational performance by the drive, the second set of the parameter values stored for subsequent use by the selected electronic circuitry of the disc drive when the disc drive is operated while having an operational temperature equal to any selected temperature from the second temperature zone;
   (e) measuring a first operational temperature of the disc drive and loading a selected one of the first or second sets of the parameter values in relation to the temperature zone in which the first operational temperature falls;
   (f) selecting a time interval comprising an increment of elapsed time;
   (g) initiating a timer which provides an indication of the passage of each successive time interval; and
   (h) at the conclusion of each successive time interval, loading the appropriate set of the parameter values from the first and second set of the parameter values corresponding to the temperature zone in which an existing operational temperature of the disc drive falls, independently of operations concurrently performed by the disc drive.

2. The method of claim 1, further comprising a step of:
   (i) prior to step (d), operating the disc drive while having an operational temperature which falls within the second temperature zone and selectively varying the parameter values utilized by the selected electronic circuitry of the disc drive.

3. The method of claim 1, wherein step (h) further comprises steps of:
   (h1) identifying a temperature boundary increment;
   (h2) combining the temperature boundary increment with the boundary temperature to obtain an increased boundary temperature greater than the boundary temperature, so that the disc drive switches from the first to the second set of the parameter values only after the existing operational temperature equals or exceeds the increased boundary temperature; and
   (h3) combining the temperature boundary increment with the boundary temperature to obtain a decreased boundary temperature less than the boundary temperature, so that the disc drive switches from the second to the first set of the parameter values only after the existing operational temperature is equal to or less than the decreased boundary temperature.

4. The method of claim 1, wherein the boundary temperature of step (a) is characterized as a first boundary temperature, and wherein the method further comprises steps of:
   (i) identifying a second boundary temperature greater than the first boundary temperature to establish a third temperature zone comprising a plurality of temperatures which sequentially extend above the second boundary temperature, wherein the second temperature zone is bounded by the first and second boundary temperatures;
   (j) selecting a third set of the parameter values which achieves a desired level of operational performance by the disc drive, the third set of the parameter values stored for subsequent use by the selected electronic circuitry of the disc drive when the disc drive is operated while having an operational temperature equal to any selected temperature from the third temperature zone; and wherein step (h) further loads the appropriate set of parameters from the first, second and third sets of the parameter values.

5. The method of claim 1, wherein the first boundary temperature is a value less than 20 degrees Celsius and the second boundary temperature is a value greater than 20 degrees Celsius.

6. A disc drive, comprising:

a head controllably positionable adjacent a rotatable disc;

a read/write channel which controls transfer of data between the disc and a host computer in which the disc drive is mountable;

a servo circuit which controls position of the head;

a temperature sensor which provides an indication of operational temperature of the disc drive; and a control processor, responsive to the temperature sensor, the read/write channel and the servo circuit, which provides top level control of the disc drive, the control processor having associated programming to:

(a) identify a boundary temperature to establish a first temperature zone comprising a plurality of temperatures which sequentially extend below the boundary temperature and a second temperature zone comprising a plurality of temperatures which sequentially extend above the boundary temperature;

(b) perform data transfer operations while the temperature sensor indicates an operational temperature which falls within the first temperature zone and selectively vary parameter values utilized by the read/write channel and the servo circuit;

(c) select a first set of the parameter values selectively varied during step (b) which achieves a desired level of operational performance by the read/write channel and the servo circuit, the first set of the parameter values stored for subsequent use when the disc drive is operated while having an operational temperature equal to any selected temperature from the first temperature zone;

(d) select a second set of the parameter values selectively which achieve a desired level of operational performance by the read/write channel and the servo circuit, the second set of the parameter values stored for subsequent use when the disc drive is operated while having an operational temperature equal to any selected temperature from the second temperature zone;

(e) measure a first operational temperature of the disc drive and load a selected one of the first or second sets of the parameter values in relation to the temperature zone in which the first operational temperature falls;

(f) select a time interval comprising an increment of elapsed time;

(g) initiate a timer which provides an indication of the passage of each successive time interval; and (h) at the conclusion of each successive time interval, load the appropriate set of the parameter values from the first and second set of the parameter values corresponding to the temperature zone in which an existing operational temperature of the disc drive falls independently of operations concurrently performed by the disc drive.

7. The disc drive of claim 6, wherein the control processor has further programming to:

(h1) identify a temperature boundary increment;

(h2) combine the temperature boundary increment with the boundary temperature to obtain an increased boundary temperature greater than the boundary temperature, so that the disc drive switches from the first to the second set of the parameter values only after the existing operational temperature equals or exceeds the increased boundary temperature; and (h3) combine the temperature boundary increment with the boundary temperature to obtain a decreased boundary temperature less than the boundary temperature, so that the disc drive switches from the second to the first set of the parameter values only after the existing operational temperature is equal to or less than the decreased boundary temperature.

8. The disc drive of claim 6, wherein the boundary temperature of programming step (a) is characterized as a first boundary temperature, and wherein the control processor has further programming to:

(i) identify a second boundary temperature greater than the first boundary temperature to establish a third temperature zone comprising a plurality of temperatures which sequentially extend above the second boundary temperature, wherein the second temperature zone is bounded by the first and second boundary temperatures;

(j) select a third set of the parameter values which achieves a desired level of operational performance by the disc drive, the third set of the parameter values stored for subsequent use by the selected electronic circuitry of the disc drive when the disc drive is operated while having an operational temperature equal to any selected temperature from the third temperature zone; and wherein the programming step (h) further loads the appropriate set of parameters from the first, second and third sets of parameters.

9. The disc drive of claim 8, wherein the first boundary temperature is a value less than 20 degrees celsius and the second boundary temperature is a value greater than 20 degrees celsius.

* * * * *

UNITED STATES PATENT AND TRADEMARK OFFICE
CERTIFICATE OF CORRECTION

PATENT NO.    : 6,078,455
DATED         : June 20, 2000
INVENTOR(S)   : Karl L. Enarson, Timothy T. Walker, Ronald D. Metzner and Anish A. Ukani It is certified that error appears in the above-identified patent and that said Letters Patent is hereby corrected as shown below:

Column 7,
Line 26, replace "Temperature zone it" with -- The "temperature zone," as used hereafter is synonymous and interchangeable with the term "temperature range." It --

Column 8,
Line 8, replace "(EP)" with -- ET --.

Signed and Sealed this

Tenth Day of September, 2002

Attest:

Attesting Officer

JAMES E. ROGAN
*Director of the United States Patent and Trademark Office*